United States Patent
Kim et al.

(10) Patent No.: US 6,434,292 B1
(45) Date of Patent: Aug. 13, 2002

(54) BIDIRECTIONAL OPTICAL WAVELENGTH MULTIPLEXER/DIVIDER

(75) Inventors: Hyoun-Soo Kim, Sungnam; Dong-Kyoon Han, Seoul, both of (KR)

(73) Assignee: Samsung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/673,880
(22) PCT Filed: Apr. 22, 1999
(86) PCT No.: PCT/KR99/00191
  § 371 (c)(1),
  (2), (4) Date: Nov. 9, 2000
(87) PCT Pub. No.: WO99/54764
  PCT Pub. Date: Oct. 28, 1999

(30) Foreign Application Priority Data

Apr. 22, 1998 (KR) ............................................ 98/14355

(51) Int. Cl.[7] .............................. G02B 6/28; G02B 6/34
(52) U.S. Cl. ............................ 385/24; 385/14; 385/37; 359/127
(58) Field of Search ................................ 359/127–130; 385/16, 24, 31, 42, 50, 14, 15, 37, 46

(56) References Cited

U.S. PATENT DOCUMENTS

| | | |
|---|---|---|
| 4,786,131 A | 11/1988 | Mahapatra et al. |
| 5,136,671 A | 8/1992 | Dragone et al. |
| 5,706,377 A * | 1/1998 | Li .................................. 385/37 |
| 5,748,811 A * | 5/1998 | Amersfoort et al. ............ 385/15 |

FOREIGN PATENT DOCUMENTS

JP  9-49936  2/1997

* cited by examiner

*Primary Examiner*—Hemang Sanghat
*Assistant Examiner*—Omar Rojas, Jr.
(74) *Attorney, Agent, or Firm*—Robert E. Bushnell, Esq.

(57) ABSTRACT

A bidirectional optical wavelength multiplexer/demultiplexer capable of simultaneously performing light multiplexing and demultiplexing is provided. This optical wavelength multiplexer/demultiplexer includes an optical waveguide array having a plurality of optical waveguides, a planar waveguide region connected to the optical waveguide array, and an arrayed waveguide grating connected to the planar waveguide region. In this device, the optical waveguide array further includes a central waveguide formed at a location on which light transmitted from the arrayed waveguide grating to the planar waveguide region is focused, on the interface between the optical waveguide array and the planar waveguide region, and light multiplexed with a plurality of wavelengths is received or output via the central waveguide. Accordingly, a central waveguide, through which multiplexed light is received and output, is added at a place where a plurality of optical waveguides and the output spectrum of these waveguides are not affected, so that the wavelength of multiplexed light can be demultiplexed in a direction from an optical waveguide array on one side to an optical waveguide array on the other side, and simultaneously demultiplexed light can be multiplexed in a direction opposite to the above direction.

15 Claims, 5 Drawing Sheets

BIDIRECTIONAL OPTICAL WAVELENGTH MULTIPLEXER/DIVIDER

TECHNICAL FIELD

The present invention relates to a bidirectional optical wavelength multiplexer and demultiplexer, and a bidirectional optical wavelength multiplexer and demultiplexer which multiplexes and demultiplexes light.

BACKGROUND ART

General optical wavelength multiplexer/demultiplexers using an arrayed waveguide grating (hereinafter, referred to as AWG) essentially apply the principle of Mach-Zehnder Interferometer, and multiplex and demultiplex light using the phase difference.

Figure 1:
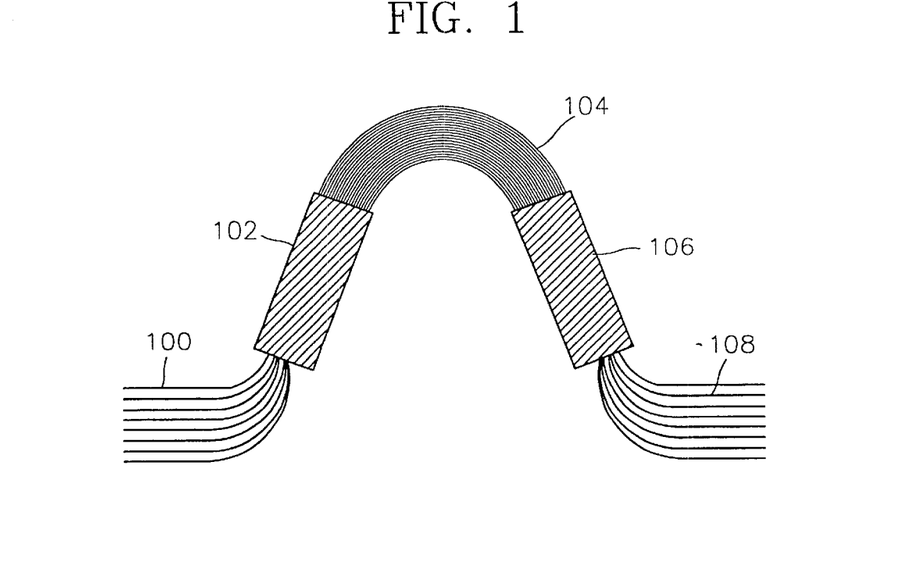
FIG. 1 is a structure view of a conventional optical wavelength multiplexer/demultiplexer.

FIG. 1 is a structure view of a conventional optical wavelength multiplexer and demultiplexer. Referring to FIG. 1, a conventional optical wavelength multiplexer and demultiplexer includes N first arrayed waveguides 100 connected to an optical fiber for receiving light having different wavelengths, a first planar waveguide region (free space region, slab waveguide, or star coupler) 102 for distributing received light, an AWG 104 for allowing light from the first planar waveguide region 102 to have different phase differences, a second planar waveguide region 106 in which the light having different phase differences output from the AWG 104 interfere with each other and land at different locations on the opposite side according to wavelength, and M second arrayed waveguides 108 for outputting the light split according to wavelength.

This operation of the optical wavelength multiplexer/demultiplexer can be explained in a grating equation which describes the dispersion characteristics of an AWG which acts as a diffraction grating with respect to incident light.

In the grating equation, the phase changes caused in the first planar waveguide region 102, the AWG 104 and the second planar waveguide region 106 are all summed, and the sum of the phase changes satisfies the condition in which interference occurs at the interface between the second planar waveguide region 106 and the second arrayed waveguides 108. The grating equation is expressed with respect to light received via an input waveguide, as in Equation 1:

$$n_s d \sin \theta + n_c \Delta L = m\lambda \quad (1)$$

wherein $n_s$ denotes the effective refractive index of a planar waveguide region, $n_c$ denotes the effective refractive index of an AWG, d denotes the pitch of an AWG, m denotes the diffraction order, $\Delta L$ denotes the length difference between adjacent AWGs, and $\lambda$ denotes the wavelength of the incident light.

A central operating frequency $\lambda_0$ is the wavelength when $\theta$ is zero, and is defined as in Equation 2:

$$n_c \Delta L = m\lambda_0 \quad (2)$$

Equation 3, which describes a variation in angular dispersion, that is, a variation in the diffraction angle of light with respect to a change in wavelength, can be obtained from Equation 1:

$$\frac{d\theta}{d\lambda} = \frac{m}{n_s d} \quad (3)$$

That is, light beams having different wavelengths land at different angles on the second planar waveguide region of an optical wavelength multiplexer/demultiplexer, according to Equation 3. Thus, an output waveguide is connected at a location corresponding to the diffraction angle of light having a wavelength used in the second planar waveguide region, and thus performs optical wavelength demultiplexing with respect to the wavelength.

A general optical wavelength multiplexer/demultiplexer using the structure of an AWG has a structure in which the left side and the right side are symmetrical to each other, so that the same function is performed independently of the direction of connection of the device. Also, in the general optical wavelength multiplexer/demultiplexer having a symmetrical structure, input and output waveguides have no difference in structure, so that an arrayed waveguide can act as an input waveguide or an output waveguide according to the direction of connection.

This optical wavelength multiplexer/demultiplexer can only operate in one direction at one time, so that there is a method for allowing the optical wavelength multiplexer/demultiplexer to operate having different channel intervals according to the state of connection of the device by differentiating the intervals between first and second arrayed optical waveguides. However, this method is also the same as the conventional method in that an arrayed waveguide acts as an input or output waveguide according to the direction of connection of the device.

Also, when this optical wavelength multiplexer/demultiplexer is applied to a real system, it is commonly installed and used in only one direction. Therefore, the manufacture of an optical wavelength multiplexer/demultiplexer which can operate with the same operation characteristics in two directions cannot be a necessary condition for designing an optimized device that satisfies a given specification.

DISCLOSURE OF THE INVENTION

An objective of the present invention is to provide a bidirectional optical wavelength multiplexer/demultiplexer which can simultaneously multiplex and demultiplex light by connecting a central waveguide at the interface between each planar waveguide region and an arrayed optical waveguide.

To achieve the above objective, the present invention provides an optical wavelength multiplexer/demultiplexer including an optical waveguide array having a plurality of optical waveguides, a planar waveguide region connected to the optical waveguide array, and an arrayed waveguide grating connected to the planar waveguide region, wherein the optical waveguide array further includes a central waveguide formed at a location on or focal point which light transmitted from the arrayed waveguide grating to the planar waveguide region is focused, on the interface between the optical waveguide array and the planar waveguide region, and light multiplexed with a plurality of wavelengths is received or output via the central waveguide.

BEST MODE FOR CARRYING OUT THE INVENTION

Figure 2:
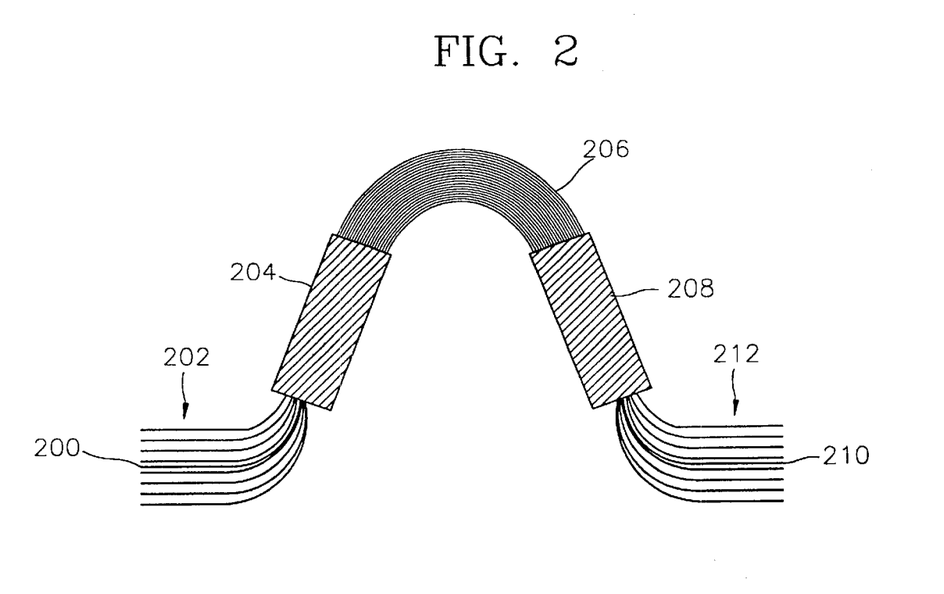
FIG. 2 is a structure view of a bidirectional optical wavelength multiplexer/demultiplexer according to the present invention.

Referring to FIG. 2, an optical wavelength multiplexer/demultiplexer according to the present invention includes a first waveguide array 202 having a first central waveguide 200, a first planar waveguide region 204, an arrayed waveguide grating (AWG) 206, a second planar waveguide region 208, and a second waveguide array 212 having a second central waveguide 210. Here, the first central waveguide 200 is formed at the focus (F1) on the interface between the first waveguide array 202 and the first planar waveguide region 204. The focus F1 is a location on the first planar waveguide region 204 where light from the AWG 206 is focused. The second central waveguide 210 is formed at the focus (F2) on the interface between the second planar waveguide region 208 and the second waveguide array 212. The focus F2 is a location on the second planar waveguide region 208 where light from the AWG 206 is focused.

Figure 3:
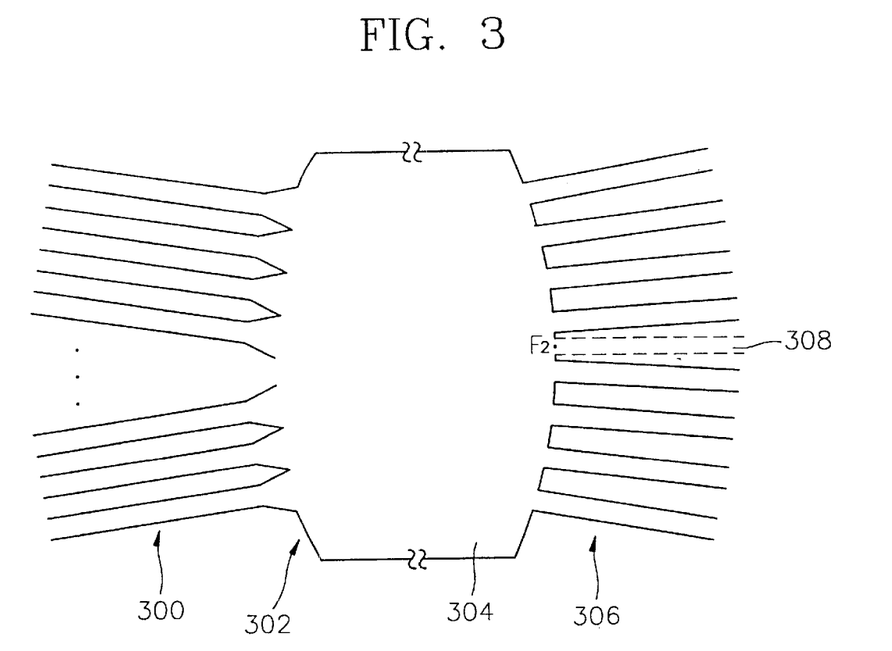
FIG. 3 shows the central waveguide of FIG. 2.

FIG. 3 shows the relationship between the central waveguide and the planar waveguide region of FIG. 2. Here, reference numeral 300 is an AWG, reference numeral 304 is a planar waveguide region, reference numeral 306 is an optical waveguide array having 8 waveguides, reference numeral 308 is a central waveguide formed at the focus F2, and reference numeral 302 denotes the interface between the AWG 300 and the planar waveguide region 304.

The interval between optical waveguides connected to a planar waveguide region denotes the interval of the wavelengths of an output spectrum. The central waveguide, which is the feature of the present invention, must be connected to a location that is independent of the locations corresponding to the wavelengths of light transmitted by a plurality of optical waveguides that perform a general multiplexing/demultiplexing function. Here, the central waveguide is connected to the substantial focus on a planar waveguide region.

Figure 4:
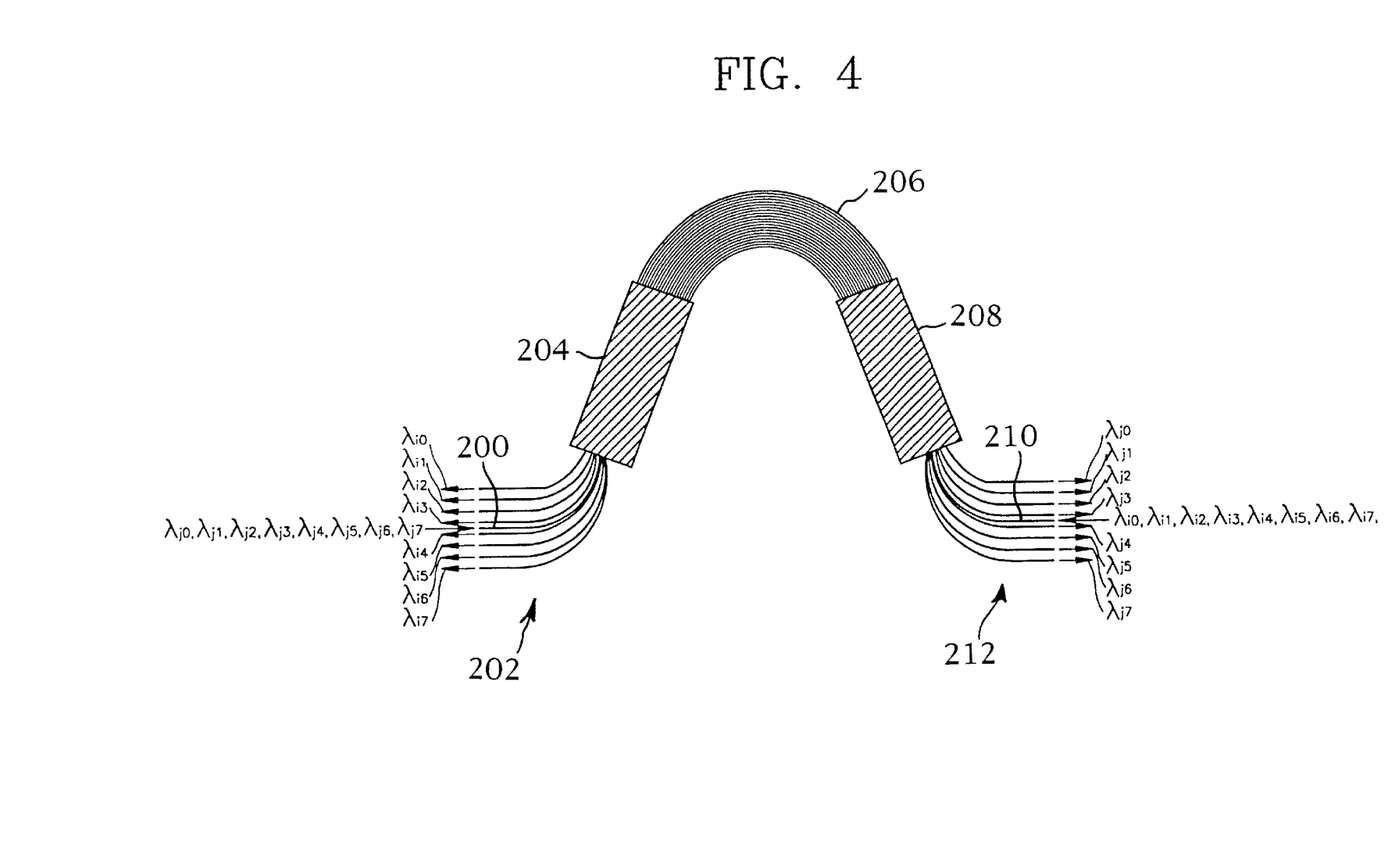
FIG. 4 shows a bidirectional optical wavelength demultiplexer using FIG. 2.

FIG. 4 illustrates an example in which a bidirectional optical wavelength multiplexer/demultiplexer according to the present invention operates as a bidirectional optical wavelength demultiplexer. When light having a wavelength of $\lambda_{j0}-\lambda_{j7}$ is input to the first central waveguide 200 in the first waveguide array 202, and simultaneously light having a wavelength of $\lambda_{i0}-\lambda_{i7}$ is input to the second central waveguide 210 in the second waveguide array 212, the light having a wavelength of $\lambda_{j0}-\lambda_{j7}$ is output via the other waveguides in the second waveguide array 212, and the light having a wavelength of $\lambda_{i0}-\lambda_{i7}$ is output via the other waveguides in the first waveguide array 202. That is, when multiplexed light having several wavelengths is received via the central waveguide formed within each of the first and second arrayed waveguides, light received via the central waveguide within an arrayed waveguide is demultiplexed by wavelengths and output via a plurality of waveguides within an arrayed waveguide opposite to the arrayed waveguide which has received the multiplexed light.

To be more specific, when light having several wavelengths is received via the first central waveguide 200, the first planar waveguide region 204 distributes the received light, and the AWG 206 allows light beams from the first planar waveguide region 204 to have different phase differences. The second planar waveguide region 208 causes interference between light beams having different phase differences, which are output from the AWG 206, and outputs light beams of different wavelengths via different waveguides within the second waveguide array 212. Likewise, when light having several wavelengths is received via the second central waveguide 210, lights of different wavelengths are output via different waveguides within the first waveguide array 202.

When the central waveguide in the bidirectional optical wavelength multiplexer/demultiplexer according to the present invention is only used as an input waveguide, it is preferable that an optical isolator is connected to the input-dedicated waveguide in order to prevent interference or a return loss due to output light.

Figure 5:
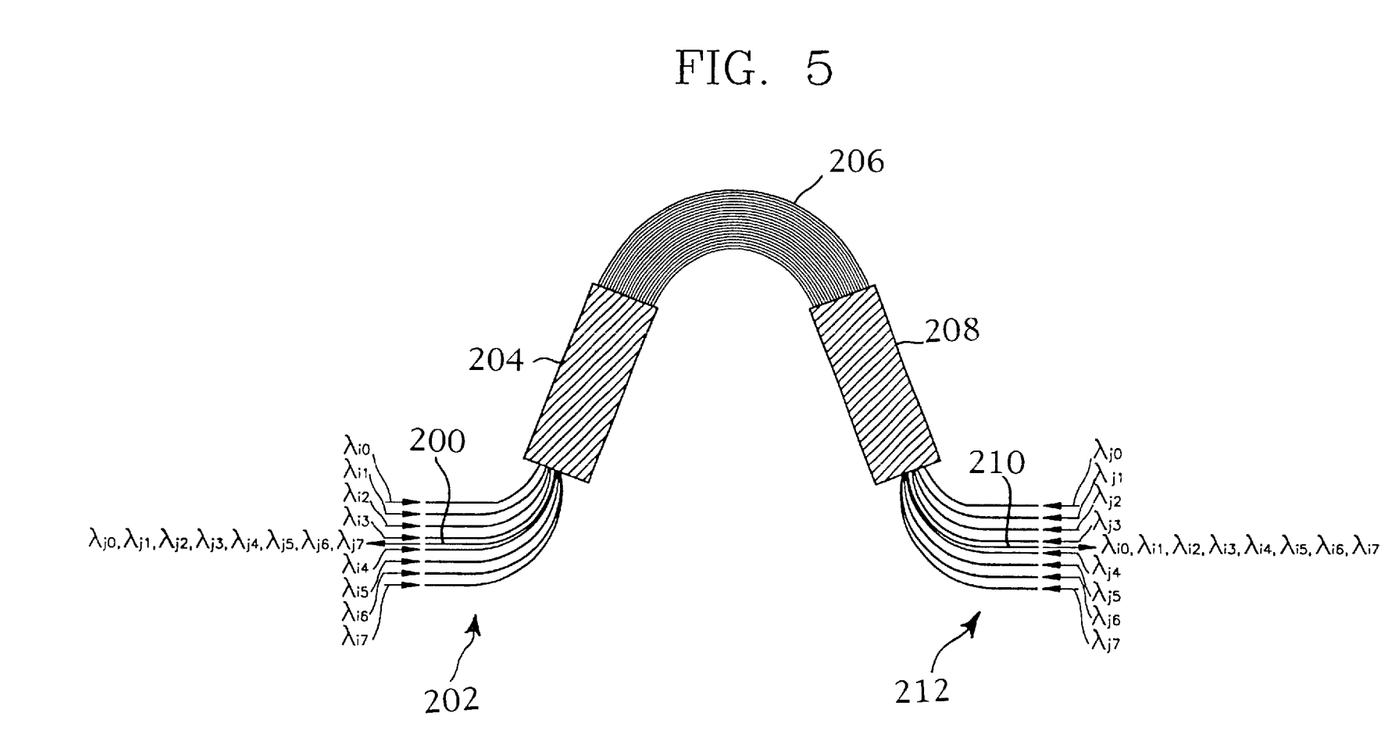
FIG. 5 shows a bidirectional optical wavelength multiplexer using FIG. 2.

FIG. 5 illustrates an example in which a bidirectional optical wavelength multiplexer/demultiplexer according to the present invention operates as a bidirectional optical wavelength multiplexer. When light beams of different wavelengths $\lambda_{i0}-\lambda_{i7}$ are received by the waveguides (except for the first central waveguide 200) of the first waveguide array 202, they are multiplexed and output via the second central waveguide 210. Likewise, when light beams of different wavelengths $\lambda_{j0}-\lambda_{j7}$ are received by the waveguides (except for the second central waveguide 210) of the second waveguide array 212, they are multiplexed and output via the first central waveguide 200.

Figure 6:
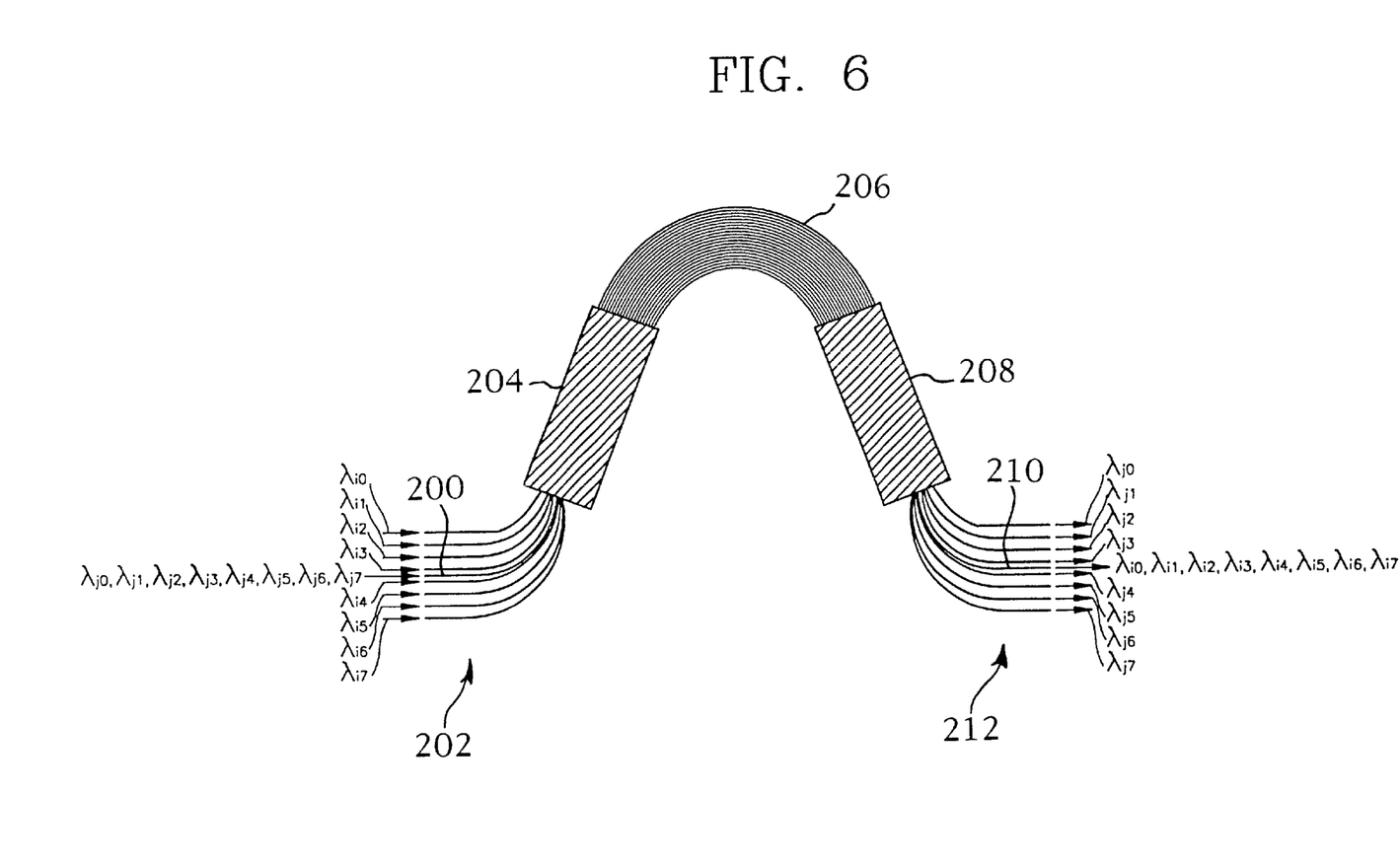
FIG. 6 shows a bidirectional optical wavelength multiplexer/demultiplexer using FIG. 2.

FIG. 6 illustrates an example in which a unidirectional optical wavelength multiplexer/demultiplexer according to the present invention operates as a bidirectional optical wavelength demultiplexer. When light having different wavelengths $\lambda_{j0}-\lambda_{j7}$ is received by the first central waveguide 200 of the first waveguide array 202, and light beams of different wavelengths $\lambda_{i0}-\lambda_{i7}$ are received by the remaining waveguides, the light beams of different wavelengths $\lambda_{i0}-\lambda_{i7}$ are multiplexed and output via the second central waveguide 210, and the multiplexed light having different wavelengths $\lambda_{j0}-\lambda_{j7}$ is demultiplexed and output via the waveguides (except for the second central waveguide 210) of the second waveguide array 212.

It is preferable that an output waveguide is selectively connected to an optical fiber in a packaging step in order for this bidirectional optical wavelength multiplexer/demultiplexer to have different channel intervals in two directions. The configuration or designing variables of a conventional optical wavelength multiplexer/demultiplexer can be used as those of the device in a chip step.

INDUSTRIAL APPLICABILITY

As described above, according to an optical wavelength multiplexer/demultiplexer according to the present invention, a central waveguide, through which multiplexed light is received and output, is added together with a plurality of optical waveguides, at a place where the output spectrum of these waveguides are not affected, so that the multiplexed light can be demultiplexed in a direction from an optical waveguide array on one side to an optical waveguide array on the other side, and simultaneously demultiplexed light can be multiplexed in a direction opposite to the above direction.

What is claimed is:

1. An optical wavelength multiplexer/demultiplexer, comprising:
   an optical waveguide array including a central waveguide and a plurality of other optical waveguides;
   a planar waveguide region connected to the optical waveguide array;
   an arrayed waveguide grating connected to the planar waveguide region;

a second planar waveguide region connected to the arrayed waveguide grating; and a second optical waveguide array connected to the second planar waveguide region, and including a second central waveguide and a plurality of further optical waveguides;

wherein the central waveguide is formed at a location, on which light transmitted from the arrayed waveguide grating to the planar waveguide region is focused, on an interface between the optical waveguide array and the planar waveguide region;

wherein only light multiplexed with a plurality of wavelengths is carried by the central waveguide, and light demultiplexed from a multiplexed light is carried by the other optical waveguides; and wherein the second central waveguide is formed at a location, on which light transmitted from the arrayed waveguide grating to the second planar waveguide region is focused, on an interface between the second optical waveguide array and the second planar waveguide region, and wherein only light multiplexed with a plurality of wavelengths is carried by the second central waveguide, and light demultiplexed from a multiplexed light is carried by the further optical waveguides.

2. The optical wavelength multiplexer/demultiplexer of claim 1, further comprising an optical isolator connected to the central waveguide for preventing at least one of an interference and a return loss due to output light.

3. An optical wavelength multiplexer/demultiplexer, comprising:

a first optical waveguide array;

a first planar waveguide region connected to the first optical waveguide array;

an arrayed waveguide grating connected to the first planar waveguide region;

a second planar waveguide region connected to the arrayed waveguide grating; and a second optical waveguide array connected to the second planar waveguide region;

wherein the first optical waveguide array comprises:
an input-dedicated waveguide formed at a location, on which light transmitted from the arrayed waveguide grating to the planar waveguide region is focused, on an interface between the first optical waveguide array and the planar waveguide region; and
a plurality of output-dedicated waveguides for outputting light beams of a plurality of wavelengths, respectively; and wherein the second optical waveguide array comprises:
an input-dedicated waveguide formed at a location, on which light transmitted from the arrayed waveguide grating to the planar waveguide region is focused, on an interface between the second optical waveguide array and the planar waveguide region; and
a plurality of output-dedicated waveguides for outputting light beams of a plurality of wavelengths, respectively; and wherein a first light beam multiplexed with a plurality of wavelengths is received via the input-dedicated waveguide of the first optical waveguide array, and light beams of wavelengths obtained by demultiplexing the first multiplexed input light beam are output only via the plurality of output-dedicated waveguides in the second optical waveguide array; and wherein a second light beam multiplexed with a plurality of wavelengths is received via the input-dedicated waveguide of the second optical waveguide array, and light beams of wavelengths obtained by demultiplexing the second multiplexed input light beam are output only via the plurality of output-dedicated waveguides in the first optical waveguide array, whereby bidirectional demultiplexing takes place.

4. The optical wavelength multiplexer/demultiplexer of claim 3, further comprising an optical isolator connected to the input-dedicated waveguide in one of the first and second optical waveguide arrays for preventing at least one of an interference and a return loss due to output light.

5. An optical wavelength multiplexer/demultiplexer, comprising:

a first optical waveguide array;

a first planar waveguide region connected to the first optical waveguide array;

an arrayed waveguide grating connected to the first planar waveguide region;

a second planar waveguide region connected to the arrayed waveguide grating; and a second optical waveguide array connected to the second planar waveguide region;

wherein the first optical waveguide array comprises:
an output-dedicated waveguide formed at a location, on which light transmitted from the arrayed waveguide grating to the planar waveguide region is focused, on an interface between the first optical waveguide array and the planar waveguide region; and
a plurality of input-dedicated waveguides for receiving light beams of a plurality of different wavelengths, respectively; and wherein the second optical waveguide array comprises:
an output-dedicated waveguide formed at a location, on which light transmitted from the arrayed waveguide grating to the planar waveguide region is focused, on an interface between the second optical waveguide array and the planar waveguide region; and
a plurality of input-dedicated waveguides for inputting light beams of a plurality of different wavelengths, respectively; and wherein a first plurality of light beams of different wavelengths is received via the plurality of input-dedicated waveguides in the second optical waveguide array, respectively, and multiplexed light, obtained by multiplexing the first plurality of light beams of different wavelengths, is output via the output-dedicated waveguide in the first optical waveguide array; and wherein a second plurality of light beams of different wavelengths is received via the plurality of input-dedicated waveguides in the first optical waveguide array, respectively, and multiplexed light, obtained by multiplexing the second plurality of light beams of different wavelengths, is output via the output-dedicated waveguide in the second optical waveguide array, whereby bidirectional multiplexing takes place.

6. An optical wavelength multiplexer/demultiplexer, comprising:

a first optical waveguide array;

a first planar waveguide region connected to the first optical waveguide array;

an arrayed waveguide grating connected to the first planar waveguide region;

a second planar waveguide region connected to the arrayed waveguide grating; and a second optical waveguide array connected to the second planar waveguide region;

wherein the first optical waveguide array comprises:
a first central waveguide for receiving light multiplexed with a first plurality of different wavelengths, the first central waveguide being formed at a location, on which light transmitted from the arrayed waveguide grating to the planar waveguide region is focused, on an interface between the first optical waveguide array and the planar waveguide region; and a plurality of input-dedicated waveguides for receiving light beams of a second plurality of different wavelengths, respectively; and wherein the second optical waveguide array comprises:
a second central waveguide for outputting only multiplexed light obtained by multiplexing said light beams received via the plurality of input-dedicated waveguides of said first optical waveguide array, the second central waveguide being formed at a location, on which light transmitted from the arrayed waveguide grating to the planar waveguide region is focused, on an interface between the second optical waveguide array and the planar waveguide region; and a plurality of output-dedicated waveguides for demultiplexing the multiplexed light received via the first central waveguide in the first optical waveguide array, according to wavelength, and for outputting the demultiplexed light beams of said first plurality of different wavelengths;

whereby multiplexing and demultiplexing take place simultaneously.

7. The optical wavelength multiplexer/demultiplexer of claim 6, further comprising an optical isolator connected to the first central waveguide for preventing at least one of an interference and a return loss due to output light.

8. An optical interconnection apparatus, comprising:
a first optical waveguide array having a first central waveguide and remaining waveguides, said first central waveguide being dedicated to inputting a first multiplexed plurality of wavelength light signals when said optical interconnection apparatus operates in a demultiplexing mode, while the remaining waveguides of said first optical waveguide array output respective wavelength light signals of a demultiplexed second multiplexed plurality of wavelength light signals;

a first planar waveguide region connected to the first optical waveguide array;

an arrayed waveguide grating connected to the first planar waveguide region;

a second planar waveguide region connected to the arrayed waveguide grating; and a second optical waveguide array having a second central waveguide and other remaining waveguides, said second central waveguide being dedicated to inputting said second multiplexed plurality of wavelength light signals when said optical interconnection apparatus operates in said demultiplexing mode, while the other remaining waveguides of said second optical waveguide array output respective wavelength light signals resulting from demultiplexing said first multiplexed plurality of wavelength light signals;

whereby bidirectional demultiplexing takes place.

9. The optical interconnection apparatus as set forth in claim 8, wherein said first central waveguide is dedicated to outputting said first multiplexed plurality of wavelength light signals when said optical interconnection apparatus operates in a multiplexing mode, while the remaining waveguides of said first optical waveguide array input respective wavelength light signals of a second plurality of wavelength light signals; and wherein said second central waveguide is dedicated to outputting said second multiplexed plurality of wavelength light signals when said optical interconnection apparatus operates in said multiplexing mode, while the other remaining waveguides of said second optical waveguide array input respective wavelength light signals which form said first multiplexed plurality of wavelength light signals;

whereby bidirectional multiplexing takes place.

10. The optical interconnection apparatus as set forth in claim 8, wherein said first central waveguide inputs said first multiplexed plurality of wavelength light signals when said optical interconnection apparatus operates in a unidirectional mode, while the remaining waveguides of said first optical waveguide array are dedicated to only inputting respective wavelength light signals of a second plurality of wavelength light signals when said optical interconnection apparatus operates in said unidirectional mode; and wherein said second central waveguide outputs said second multiplexed plurality of wavelength light signals when said optical interconnection apparatus operates in said unidirectional mode, while the other remaining waveguides of said second optical waveguide array are dedicated to only outputting respective wavelength light signals resulting from demultiplexing said first multiplexed plurality of wavelength light signals when said optical interconnection apparatus operates in said unidirectional mode;

whereby simultaneous multiplexing and demultiplexing take place.

11. An optical wavelength multiplexer/demultiplexer, comprising:
an optical waveguide array including a central waveguide and a plurality of other optical waveguides;

a planar waveguide region connected to the optical waveguide array; and an arrayed waveguide grating connected to the planar waveguide region;

wherein the central waveguide is formed at a location, on which light transmitted from the arrayed waveguide grating to the planar waveguide region is focused, on an interface between the optical waveguide array and the planar waveguide region;

wherein only light multiplexed with a plurality of wavelengths is carried by the central waveguide, and light demultiplexed from a multiplexed light is carried by the other optical waveguides; and wherein the central waveguide outputs the light multiplexed with the plurality of wavelengths after multiplexing takes place, and the other optical waveguides receive and input light of various wavelengths for multiplexing, whereby bidirectional multiplexing takes place.

12. An optical wavelength multiplexer/demultiplexer, comprising:
an optical waveguide array including a central waveguide and a plurality of other optical waveguides;

a planar waveguide region connected to the optical waveguide array; and an arrayed waveguide grating connected to the planar waveguide region;

wherein the central waveguide is formed at a location, on which light transmitted from the arrayed waveguide grating to the planar waveguide region is focused, on an interface between the optical waveguide array and the planar waveguide region;

wherein only light multiplexed with a plurality of wavelengths is carried by the central waveguide, and light demultiplexed from a multiplexed light is carried by the other optical waveguides; and wherein the central waveguide receives and inputs the light multiplexed with the plurality of wavelengths for demultiplexing, and the other optical waveguides output the light demultiplexed from the multiplexed light, whereby bidirectional demultiplexing takes place.

13. The optical wavelength multiplexer/demultiplexer of claim 1, wherein the central waveguide outputs the light multiplexed with the plurality of wavelengths after multiplexing takes place, and the other optical waveguides receive and input light of various wavelengths for multiplexing, whereby bidirectional multiplexing takes place.

14. The optical wavelength multiplexer/demultiplexer of claim 13, wherein the light multiplexed with the plurality of wavelengths outputted by the central waveguide is produced as a result of multiplexing light received and inputted by the further optical waveguides of the second optical waveguide array.

15. The optical wavelength multiplexer/demultiplexer of claim 13, wherein the light demultiplexed from the multiplexed light and carried by the other optical waveguides is multiplexed to produce the light multiplexed with the plurality of wavelengths and carried by the second central waveguide, the second central waveguide outputting the light multiplexed with the plurality of wavelengths.

* * * * *